(Model.)
J. BAGOT.
COMBINED PERCH AND PARASITE TRAP.
No. 273,434. Patented Mar. 6, 1883.
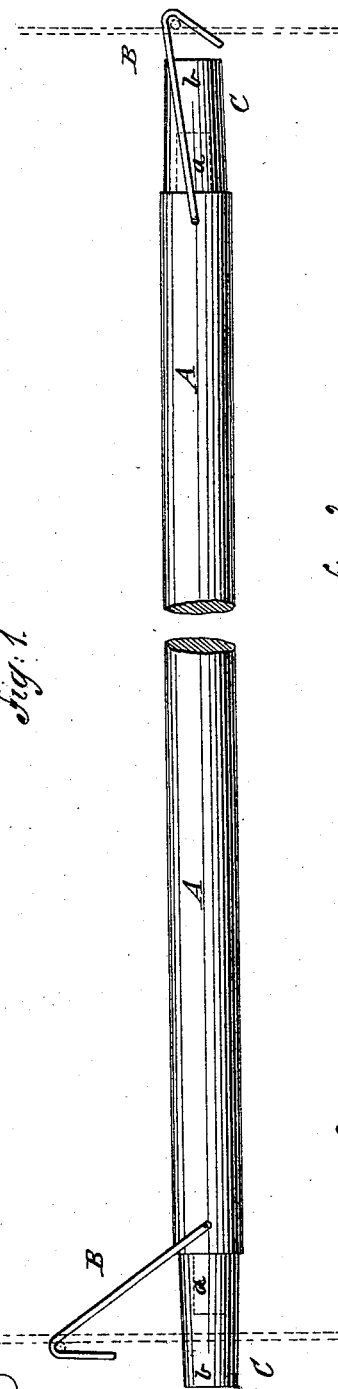
Fig. 1.
Fig. 3.
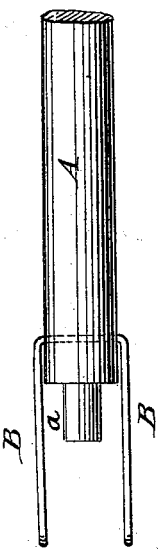
Fig. 2.
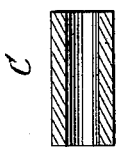
WITNESSES:
INVENTOR:
J. Bagot
BY Munn & Co.
ATTORNEYS.

UNITED STATES PATENT OFFICE.

JOSEPH BAGOT, OF BROOKLYN, NEW YORK.

COMBINED PERCH AND PARASITE-TRAP.

SPECIFICATION forming part of Letters Patent No. 273,434, dated March 6, 1883.

Application filed May 11, 1882. (Model.)

*To all whom it may concern:*

Be it known that I, JOSEPH BAGOT, of Brooklyn, in the county of Kings and State of New York, have invented a new and useful Improvement in a Combined Perch and Parasite-Trap, of which the following is a full, clear, and exact description.

Reference is to be had to the accompanying drawings, forming a part of this specification, in which similar letters of reference indicate corresponding parts in all the figures.

Figure 1 is a side elevation of my improvement. Fig. 2 is a plan view of a part of the same. Fig. 3 is a sectional elevation of the trap detached.

The object of this invention is to facilitate the attachment and removal of perches from their supports, and also the destruction of parasites that may infest the birds or fowls using the perches.

The invention consists in a combined perch and parasite-trap constructed with a rigid body having a short tenon at each end to enter tubes longer than said tenons, whereby cup-shaped recesses are formed at the ends of the perch for parasites, as hereinafter fully described.

A represents the body of the perch, which is made of wood or other suitable material, and to which, near its ends, are hinged hooks B. The hooks B are made in pairs, and may be formed by passing a wire through the end part of the perch A, and then bending the wire parallel with the perch and forming hooks upon its ends. The hooks B should be made enough longer than the ends of the perch-body to allow the said hooks to be hooked upon supports in line or nearly in line with the said perch, as shown at the right-hand part of Fig. 1. With this construction the hooks B can be hooked upon supports at a less distance apart than the length of the perch, as illustrated at the left-hand part of Fig. 1.

Upon the ends of perch A are formed round tenons $a$, upon which are placed the ends of short tubes C, of rubber or other suitable material, of greater length than the tenons $a$, so as to form cups or recesses $b$, into which parasites from the birds or fowls using the perch can crawl, so that the said parasites can be readily destroyed by removing the tubes C and inserting them in boiling water, or in any other convenient manner.

If desired, the ends of the tubes C can be inserted in perforations formed in the ends of the perch A; but I prefer the construction first described, as being more convenient in use and less liable to leave parasites upon the ends of the perch when the tubes C are detached.

The perches can be made small and used in bird-cages, or made large and used in hen-houses, the size being immaterial.

Having thus described my invention, I claim as new and desire to secure by Letters Patent—

The combination, with the perch A, having a short tenon, $a$, at each end, of the tubes C, longer than said tenons, whereby cup-shaped recesses are formed at the ends of the perch for parasites, substantially as shown and described.

JOSEPH BAGOT.

Witnesses:
JAMES T. GRAHAM,
C. SEDGWICK.